United States Patent [19]

Crockett

[11] Patent Number: 4,848,976

[45] Date of Patent: Jul. 18, 1989

[54] LAMINATED GEAR SHAVING TOOLS

[76] Inventor: James C. Crockett, P.O. Box 7, Budleigh Salterton, Devon EX9 7JU, United Kingdom

[21] Appl. No.: 14,045
[22] PCT Filed: Jun. 18, 1986
[86] PCT No.: PCT/GB86/00355
§ 371 Date: Feb. 17, 1987
§ 102(e) Date: Feb. 17, 1987
[87] PCT Pub. No.: WO86/07551
PCT Pub. Date: Dec. 31, 1986

[30] Foreign Application Priority Data

Jun. 18, 1985 [GB] United Kingdom ............... 8515445
Sep. 9, 1985 [GB] United Kingdom ............... 8522265

[51] Int. Cl.[4] ............................................. B23P 15/44
[52] U.S. Cl. ........................................ 407/27; 407/28
[58] Field of Search ....................... 407/20, 21, 23, 24, 407/26-29, 25, 37

[56] References Cited

U.S. PATENT DOCUMENTS

| | | |
|---|---|---|
| 1,807,665 | 6/1931 | Miller . |
| 2,137,146 | 11/1938 | Simmons . |
| 2,171,325 | 8/1939 | Hagwood . |
| 2,329,284 | 9/1943 | Mentley . |
| 2,356,868 | 8/1944 | Miller . |
| 3,169,447 | 2/1965 | Hurth ................................. 407/27 |
| 3,685,112 | 8/1972 | Lohrer ................................ 407/27 |

FOREIGN PATENT DOCUMENTS

| | | |
|---|---|---|
| 656423 | 2/1938 | Fed. Rep. of Germany . |
| 1037812 | 8/1958 | Fed. Rep. of Germany . |
| 1180223 | 11/1964 | Fed. Rep. of Germany . |
| 1527156 | 7/1969 | Fed. Rep. of Germany . |
| 2506199 | 11/1982 | France . |
| 1163388 | 3/1968 | United Kingdom . |

*Primary Examiner*—Frederick R. Schmidt
*Assistant Examiner*—Robert Showalter
*Attorney, Agent, or Firm*—Leydig, Voit & Mayer

[57] ABSTRACT

A laminated gear shaving tool formed by a stack of toothed discs mounted on a rotatable body. The flanks of each tooth are cut away to form lands, the lands being successively laterally displaced (staggered) across the disc thickness around the circumference. The cutting edges may be inclined across the tooth thickness and/or the lateral face may be re-entrant; the discs may be inclined to the axis of rotation of the tool; and, where the corresponding lands are not staggered, the toothed discs may be separated by spacing discs.

5 Claims, 8 Drawing Sheets

VIEW A

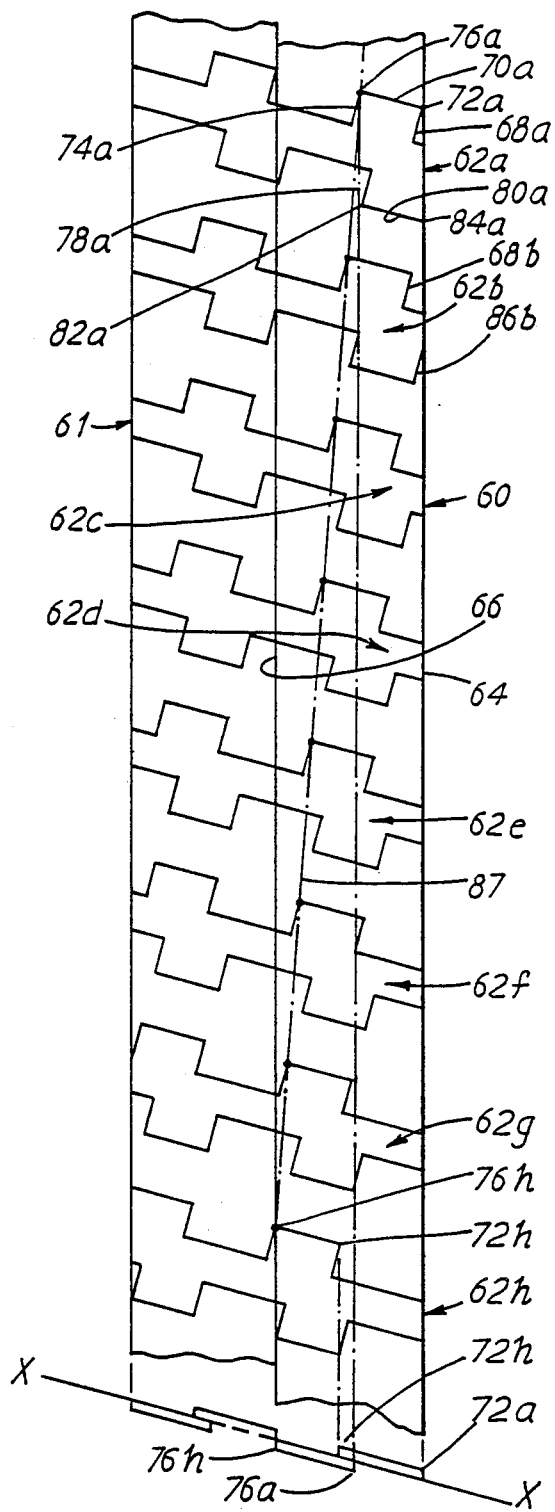

LAMINATED GEAR SHAVING TOOLS

BACKGROUND OF THE INVENTION

This invention relates to laminated gear shaving tools.

A tool of this type is used for a finishing operation only, the gear to be finished having already been produced by some other method, and is a gear-like member usually with a large number of teeth and having channels formed down each tooth flank to provide cutting edges on the serrations left therebetween. As shown in FIG. 1 of the accompanying drawings, which is an isometric view of two teeth 10,12 of conventional prior art tool, formed from a solid blank, these channels 14 run down each flank of each tooth from crown to root to form serrations 16 therebetween, usually terminating in a drilled hole or slot 18 at the root of the tooth. An accepted method of producing the channels 14 is to progressively feed a slotting tool 20 to the required depth; while in some cases the tool 20 is moved in a straight line (so the depth d of the channel 14 is not constant) in others it follows the involute curve giving a constant depth.

It has been proposed in U.S. Pat. No. 2,119,298 (Simowski) to form a gear shaving tool by laminating a plurality of similarly formed toothed discs (which term is similarly used throughout this specification to include discs having a central aperture, i.e. of annular form), the flanks of the teeth being relieved from one or both side faces of the disc to form a land, the lateral edges of which are spaced inwardly from the sides of the disc and constitute cutting edges. Configurations of disc teeth to form both helical and spur gear shaving tools are described.

FIG. 2 of the accompanying drawings is a partial axial section through a prior art laminated gear shaving tool 22 of the above type fabricated from a series of annular discs 24 (edge reliefs omitted) which are assembled together on a body 26 and clamped together mechanically by bolts 28 co-operating with end plates 30,32 which are typically of different radial extent. An alignment pin or keyway not shown is provided in each individual disc 24 in order to ensure that the discs can be assembled in the correct alignment and to resist the forces which will be applied to the serrations during cutting.

There are certain techniques of gear shaving commonly referred to as 'plunge' or 'underpass' which require the serrations to be staggered with respect to each other around the tool periphery so that the cutting edges are not in line with each other in the plane of rotation of the tool. Such a requirement cannot be met by teeth formed in the manner described in the above U.S. Patent and it is an aim of the invention to provide this facility.

SUMMARY OF THE INVENTION

According to the first aspect of the present invention there is provided a laminated gear shaving tool comprising a stack of toothed discs, a land being formed on the flanks of each tooth of a disc by cutting away the tooth from one or both sides of the disc to form a serration terminating in a land in each flank face, such that the land on each flank of one tooth is offset with respect to the corresponding land on each adjacent tooth. Preferably the lands on successive teeth are laterally displaced around the periphery of the disc from a position adjacent one side of the disc to a position adjacent the other side of the disc.

Preferably the discs are inclined to the axis of rotation to provide a further overlap of the serrations from one plate disc to another.

In crossed axis gear shaving the sliding velocity is the resultant of the sliding velocity down the flanks and the velocity across the flanks and it changes speed and direction from tip to root of the teeth. An improvement in cutting efficiency is obtained according to a second aspect of the present invention by cutting the teeth so that the lateral cutting edges of the land on each flank are inclined to the plane of a face of the disc and preferably lie in opposite directions on the corresponding flanks of alternate teeth.

The shaving process is not efficient and involves high pressures to ensure that the cutting serrations penetrate the flanks of the gear being finished in order to remove metal. It is essential therefore that the cutting serrations on the tool be produced in an efficient manner in order to obtain the optimum shape and surface finish on the workpiece.

It can be seen from FIG. 1 that with a conventional prior art tool the serrations down the flanks can only be produced in the plane shown by X, and it is a third aim of the present invention is to provide serrations on the cutting blades with a shape and surface finish which gives an improved cutting efficiency.

To appreciate the advance made by the present invention in this respect it is first necessary to consider the current state of the art. FIGS. 3 and 4 are respectively a part axial section and plan of a conventional prior art shaving tool 50 with the cutting serrations 52 formed by a slotting tool which may have one or multiple teeth. FIG. 5 is a detail similar to FIG. 4 showing a different form of toothing of a prior art tool; the usual form of serration produced is shown in FIGS. 3 and 4 while the preferred rectangular form 54 is shown in FIG. 5.

The shape of FIG. 5 is difficult to produce in a satisfactory manner by conventional means and the surface finish achieved on the cutting edges is poor.

The above-mentioned U.S. Patent shows serrations of rectangular cross-section formed by advancing a grinding wheel in the direction of its plane of rotation.

An attempt to improve the quality of the surface of the groove wall of rectangular serrations is disclosed in U K Specification No. 1 163 388 according to which the serrated gear shaving teeth are formed of a plurality of plate-like toothed cutting elements disposed side by side, the said elements having tooth flanks which form the tooth flanks of the cutting body, and adjacent elements being offset relative to one another so that the leading tooth flanks (in a given direction of movement) of the cutting body are formed by the leading tooth flanks of a first set of alternate cutting elements and the trailing tooth flanks of the cutting body are formed by the trailing tooth flanks of the other set of alternate cutting elements, the trailing flanks of the first set of cutting elements and the leading flanks of the other set of cutting elements being inset relative to the corresponding tooth flanks of the cutting body. The elements are either in contact and the trailing flanks of the first set and the leading flanks of the other set form the bottoms of grooves defined by faces of the elements or the adjacent elements are spaced from one another by disk- or plate-like spacers.

According to a third aspect of the present invention there is provided a laminated gear shaving tool comprising a body and, rigidly mounted thereon, a series of discs having peripheral teeth, each flank of which is cut away at each side to form a serration terminating in a land in the flank face and having re-entrant side faces. The cutting edges formed by the intersection at an acute angle of the land an a re-entrant side face is superior to the perpendicular intersection of the prior art.

According to a fourth aspect of the present invention there is provided a laminated gear shaving tool comprising a body and, rigidly mounted thereon, a series of discs having peripheral teeth, the flank of each tooth being cut away on at least one side to form a serration terminating in land in the flank face, the lateral edges of which land constitute cutting edges, characterised in that adjacent discs are separated from one another by laminated spacing elements.

In such an arrangement the peripheral faces of the spacing elements form at least part of the bottoms of the serrations and can therefore be made of cheaper material than the blades. Moreover the use of spacers entails less machining, as the depth to which the flanks have to be cut away is less than is the case with juxtaposed blades.

In recent years the pitch or size of tooth used has reduced and pitches of about 1¼ to 1½ module (16-20 DP) are quite common. The effect of this change has been to render the shaving tools difficult, and sometimes nearly impossible, to manufacture by the traditional methods of forming the serrations down the flanks of teeth formed from a solid piece of metal. Referring again to the prior art tool of FIG. 1 it will be seen that the gap W at the base of the teeth 10,12 through which the slotting tool 20 must initially pass in order to feed to the depth d is very small, and it is not possible to pass a tool of sufficient rigidity through it.

The present invention allows teeth of improved form to be provided while at the same time avoiding the limitations of the conventional prior art process of cutting the tool from a solid blank. The invention also allows a serration to be formed on one flank of a tooth which is offset with respect to that on the other flank.

Moreover the present invention allows advantage to be taken of modern hard materials and the plates may be made in carbide or ceramics or any similar hard cutting material.

Still further the present invention allows the use of modern surface finish treatments such as titanium nitride commonly referred to as TIN coating. For such treatments to be full effective the surface to be treated must be metalurgically clean and this is difficult to achieve on conventional shaving tools due to the poor surface finish on the serrations. With the laminated technique the individual plates may be ground all over including the cutting serrations and thus provide an ideal surface for the TIN treatment. The TIN treatment may be applied to the individual plates prior to assembly and again after the final tooth grinding if necessary.

Yet further advantages are that the thin plates may be cut with modern techniques such as lasers, and that the amount of high speed steel required is reduced since the body of the tool can be made of a cheap material.

BRIEF DESCRIPTION OF THE DRAWINGS

FIG. 6 is a developed plan of a blade of a helical gear shaving tool according to the first aspect of the present invention;

DETAILED DESCRIPTION OF THE PREFERRED EMBODIMENTS

Figure 1:
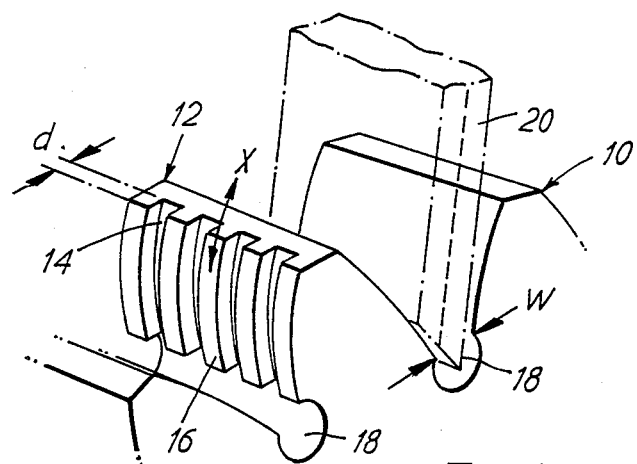
FIG. 1 is an isometric view showing two teeth of a conventional prior art gear shaving tool.
Figure 2:
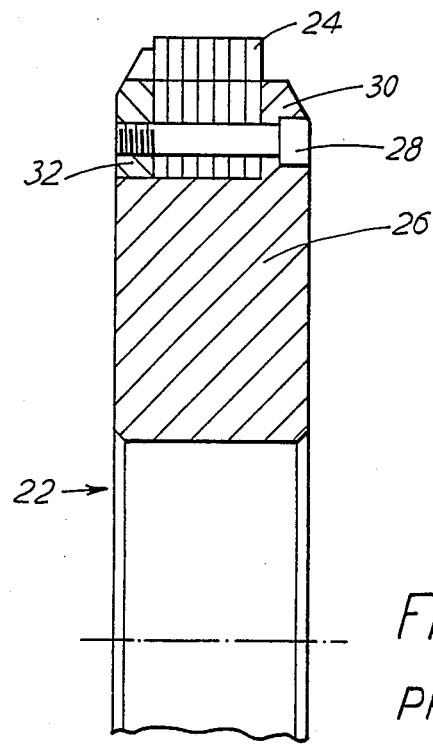
FIG. 2 is a partial axial section through a conventional prior art laminated gear shaving tool.
Figure 3:
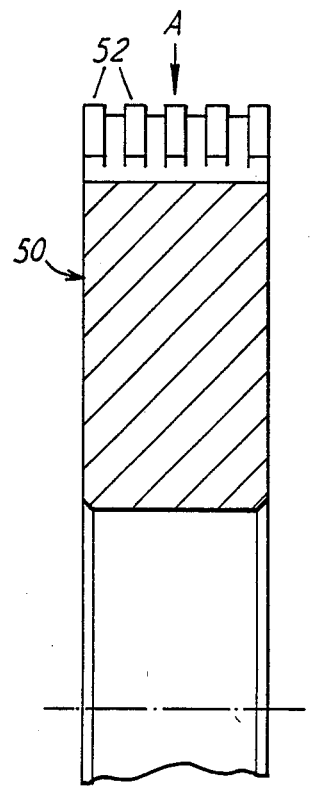
FIG. 3 is a partial axial section of a conventional prior art shaving tool with cutting serrations formed by a slotting tool which may have one or multiple teeth.
Figure 5:
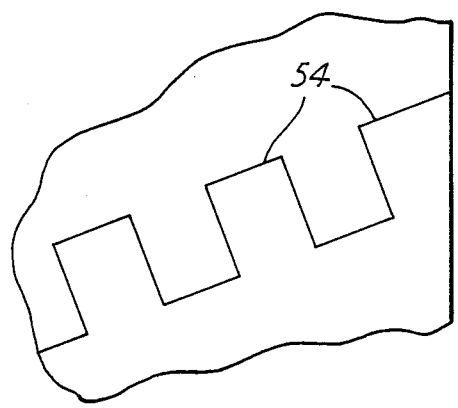
FIG. 5 is a partial plan view of a conventional prior art gear shaving tool and showing a preferred rectangular form of teeth.
Figure 4:
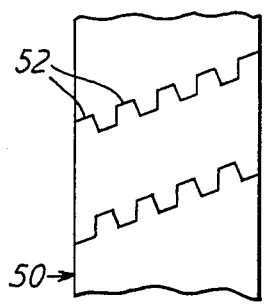
FIG. 4 is a partial plan view of a conventional prior art shaving tool with cutting serrations formed by a slotting tool which may have one or multiple teeth.

FIG. 6 is a developed plan of the circumference of two adjacent blades or discs 60,61 of a laminated gear shaving tool, showing all the teeth 62a-h on each blade.

One face of the blade 60 is indicated by 64 and the other by 66.

The flank of the top tooth 62a is formed by machining the blade face 64 at the upper flank of the tooth 62a to form a side face 68a defining one side of a land 70a and a cutting edge 72a. Both flanks of the tooth 62a are machined away to different depths from the blade face 66 to form a side face 74a defining the other side of the land 70a and a cutting edge 76a, and a side face 78a on the lower flank of the tooth 62a defining one side of a land 80a and a cutting edge 82a. A cutting edge 84a is defined by the intersection of the land 80a with the blade 64.

Figure 7:
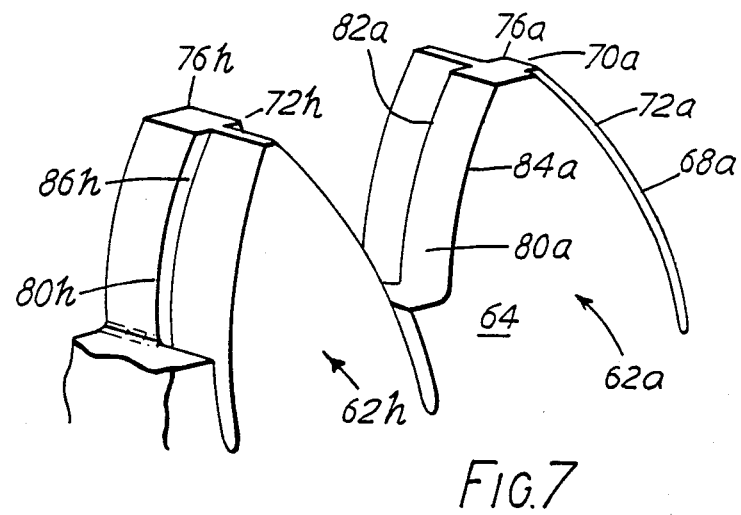
FIG. 7 is an isometric view of the top and bottom teeth shown in FIG. 6.

Both flanks of the tooth 62b are machined from the blade face 64 to form side faces 68b and 86b, while the machining from the face 66 is performed to corresponding lesser depths. The machining depth from the blade face 64 is increased for successive teeth and that from face 66 is decreased until, at the tooth 62h, the lands 70a, 80a are adjacent to the opposite blade face 66. The cutting edge 76 thus moves across on successive teeth along a stagger line 87 from the medial position of 76a finishing up at 76h on tooth 62h, i.e. adjacent blade face 66. It can be seen that the cutting edges 76 are displaced with respect to each other relative to the plane of rotation, e.g. the plane of blade face 64. FIG. 7 is an isometric rear view of the teeth 62a and 62h showing how the cutting edge 76a is displaced between these teeth, which is achieved by varying the depth of the machining.

When the blades are assembled together (FIG. 6) so that blade 60 is in contact with blade 61 a joint line exists. The action of cutting can be seen by following the path of a pair of cutting edges 72a and 76a on tooth 62a to edges 72h and 76h on tooth 62h. The line XX represents the common line tangent to both the flank of the tool and the gear. It can be seen that as the tool rotates in a plane parallel to face 64 the cutting edge 76a transfers down to the line XX and the edge 72h on tooth 62h also moves in the same plane but contacts the line XX further along. As the tool rotates therefore the cutting edges from 76a to 76h move along the line XX and finish the area indicated. Similarly the edges 72a and 72h rotate in the same plane and produce the section on XX as indicated. It can be seen that there is an overlap of the action at the centre on line XX at the centre of the blade 60 but at the joint line there is no overlap. It is essential that the joint line be maintained and the cutting edges must not fall short leaving an area unshaved.

Figures 6A, 6B:
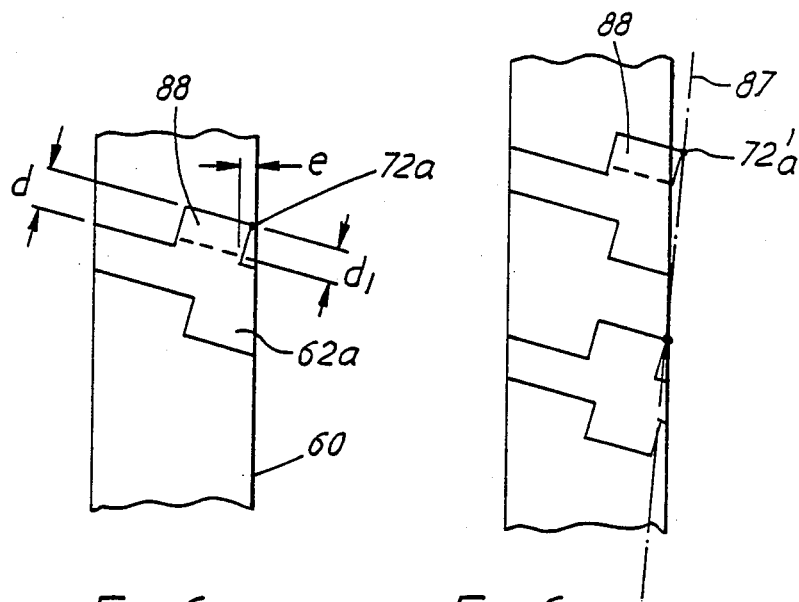
FIGS. 6a and b are details of FIG. 6 showing a modified form of teeth.

When the tool is blunt the flanks are regenerated which reduces as shown in FIG. 6a the depth d of serration 88 and forms new sharp cutting edges. As the tool is progressively sharpened the tooth depth reduces to a minimum d, and in doing so the edge 72a tooth 62a moves away from the joint line on face 60. In order to overcome this situation the stagger line 87 of the cutting edges 72 may initially be positioned, as shown in FIG. 6b, so that it starts outside the face 60 as indicated by the notional cutting edge 72a, such that after sharpening it maintains the joint line. There is thus always one improved cutting edge 72 on the joint line.

Figure 8:
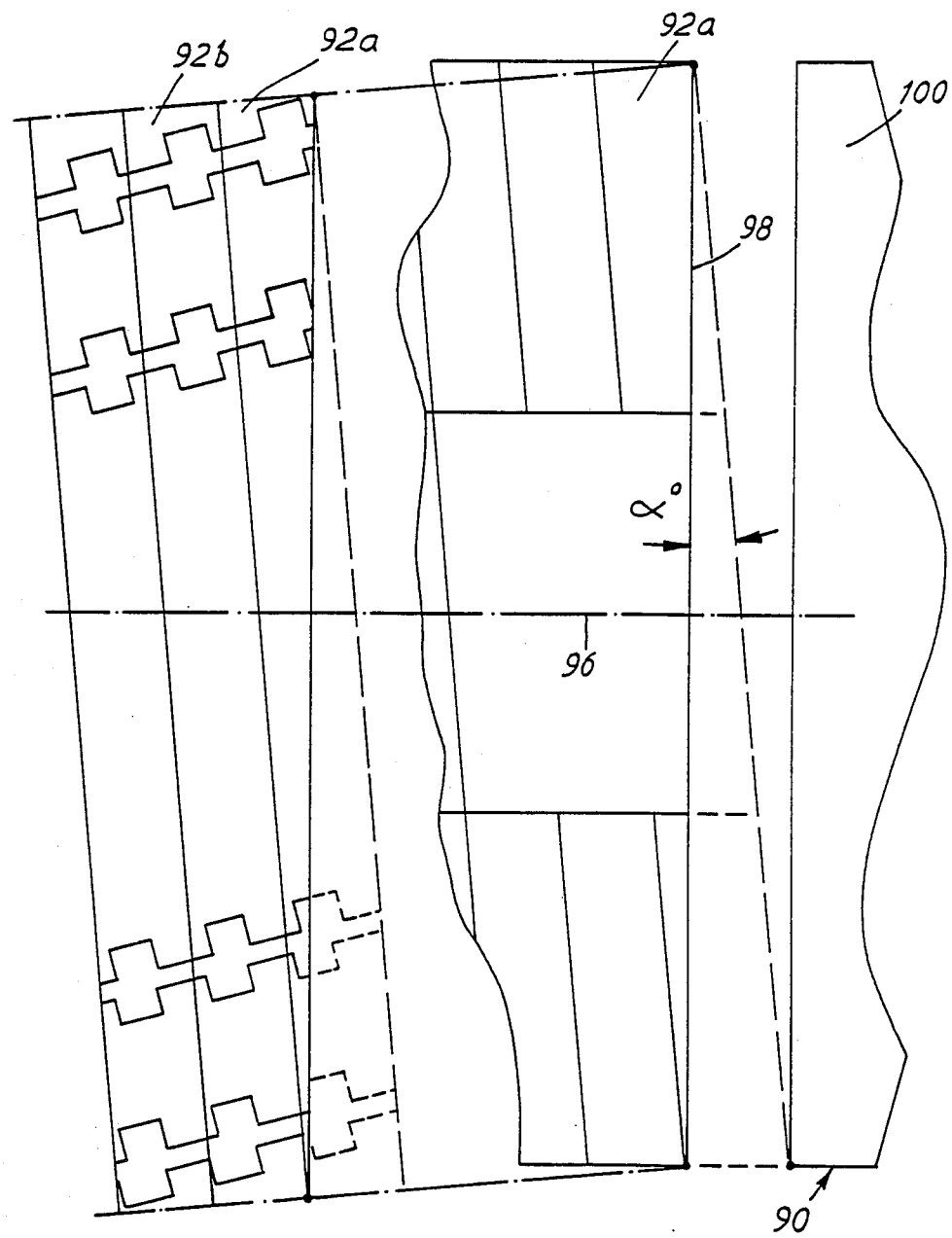
FIG. 8 is an exploded partial section of another embodiment of the first aspect of the invention.

The gear shaving tool 90 in FIG. 8 is a modification of the tool shown in FIGS. 6 and 7 in which adjacent pairs of cutting blades 92a and 92b which are of the staggered tooth form of the blades 60,61 of FIGS. 6 and 7; the blades 92 are inclined at an angle $\alpha$ to a plane perpendicular to the axis of rotation 96. The end blade 92a has a secondary machining operation performed on its outer face 98 so that it lies in the plane of rotation and is parallel with the axially normal face of an end pressure plate 100. The other side of the tool 90 is correspondingly formed.

Figure 9:
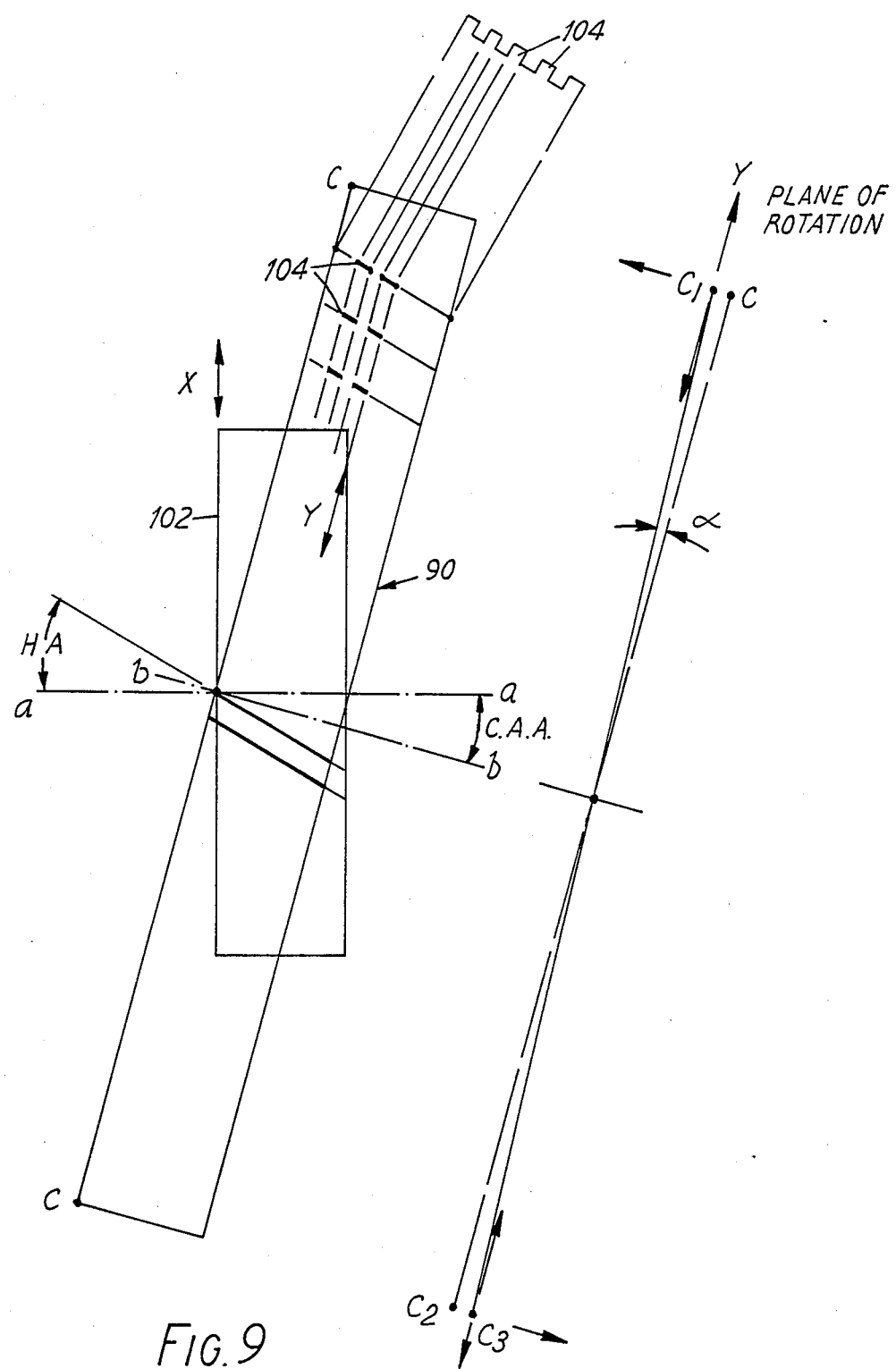
FIG. 9 is a diagrammatic elevation of the tool of FIG. 8 meshing with a gear being shaved.

FIG. 9 shows in more detail the shaving tool 90 meshing with a gear 102 and for the sake of clarity the cutting serrations 104 are shown in line. The gear 102 rotates around axis aa in the plane X while the tool rotates around axis bb in the plane Y. It can be seen that as the plates are inclined at an angle $\alpha$ to the axis bb of the tool 90 then the point C moves left to $C_1$ and point $C_2$ moves right to $C_3$; and that in the plane of rotation Y the points $C_1$ and $C_3$ are now off set with respect to each other.

In the tool of FIGS. 6 and 7 the individual cutting edges 76a always lie in the same plane of rotation.

Shaving tools are manufactured with odd numbers of teeth in order to optimise the hunting effect of the teeth of the tool relative to the teeth of the gear. Inclination of the blades 92 provides a further stagger effect because of the combination of odd numbers of teeth and the inclination effect as discussed with reference to FIG. 9.

Moreover, inclination overcomes the situation which occurs at the joint line of the blades 60,61 (see FIG. 6). As explained, the cutting edge 76a on tooth 62a moves to 76h on tooth 62h creating the stagger effect along line 87. An overlap occurs between edges 72h and 76a when transferred to the line XX, whereas 72a and 76h meet on the joint line of the blades 60,61 i.e. where faces 64 and 66 meet. In the event this joint line shows as a mark on the flank of the finished gear, it can be avoided by the use of inclined blades 60,61.

Figure 10:
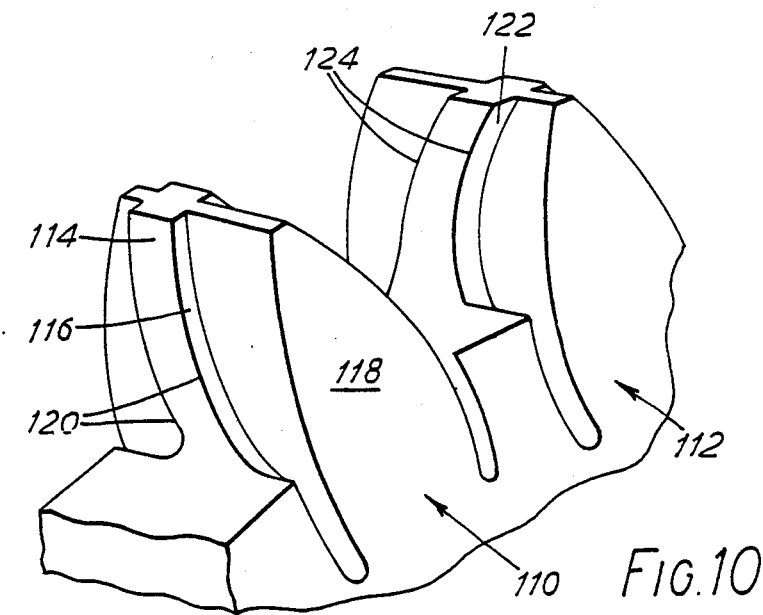
FIG. 10 is an isometric view of two adjacent teeth of a blade of a tool according to the second aspect of the invention.

In FIG. 10 there are depicted two adjacent teeth 110, 112 of a single blade. The flanks of the teeth 110 are machined such that a medial serration 114 has side faces 116 defining cutting edges 120 inclined to the face 118 of the tooth; the curved cutting edges 120 thus provided improve the cutting efficiency, bearing in mind that lines of pressure on the flanks of a shaved gear lie diagonally across the flanks.

On the tooth 112 the lands 122 and cutting edges 124 lie in the opposite direction to those on the tooth 110.

Figure 11:
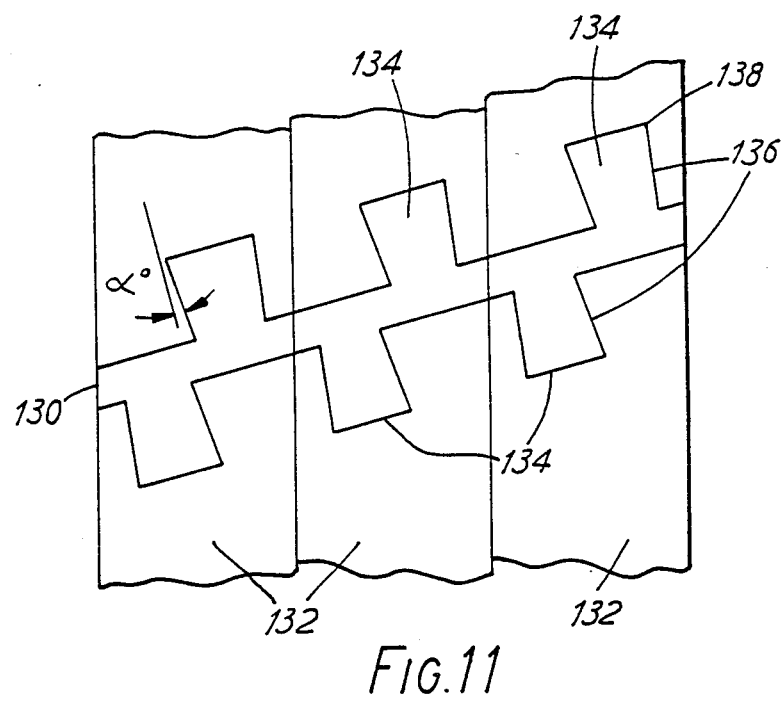
FIG. 11 is a fragmentary plan of a blade tooth according to the third aspect of the invention.

FIG. 11 shows in plan both flanks of a tooth 130 formed of a series of blades 132. The serrations on the flank are formed by machining each blade tooth 130 to form serrations 134 with re-entrant side faces 136 inclined at an angle $\alpha°$ to a plane normal to the flank of the tooth. The resultant acute angled cutting edges 138 have increased effectiveness compared to cutting edges formed by mutually perpendicular surfaces.

Figure 12:
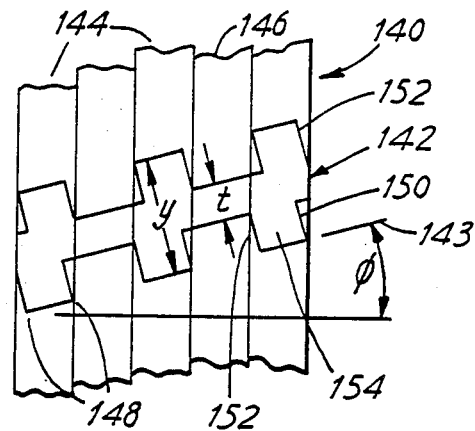
FIG. 12 is a fragmentary plane of a series of adjacent, spaced blade teeth of a tool according to a fourth aspect of the invention.

As shown in FIG. 12 a shaving tool 140 having helical teeth 142 forming a flank line 143 inclined at a helix angle $\phi$ to the tool axis is formed by alternate toothed cutting blades 144 and toothed spacers 146, the tooth thickness t of the spacers 146 being less than that y of each tooth on the blades 144 which provide cutting edges 148.

Figure 13:
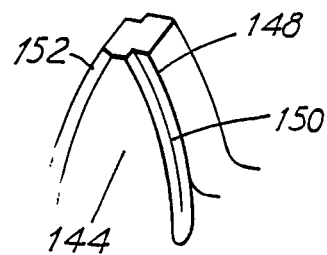
FIG. 13 is a rear view of a tooth of FIG. 12.

The end face of each tooth flank is machined to provide side faces 150,152 (as best shown in FIG. 13) which are normal to the helix line 143, thus defining serrations 154 of rectangular form. In modifications, the side faces 152 may be re-entrant or any desired form.

It can be seen that the flanks of the spacer teeth 146 largely define the bottoms of the grooves between the serrations 154 and, as no cutting function is required of the spacers 146, they can be formed of a lower grade steel than the blades 144. Moreover, the use of spacers requires less machining of the blades to form grooves between the serrations.

The grooves are provided to form cutting edges and to allow for resharpening of the tool as the edges become blunt. The depth of the groove therefore determines the number of times the tool may be sharpened. As explained with reference to FIG. 1 the depth of groove which may be applied by conventional techniques is limited. By the use of the technique described in the invention there is no such limitation on the depth of groove and more sharpenings can be obtained, and this is a further advantage provided by the invention.

Figure 14:
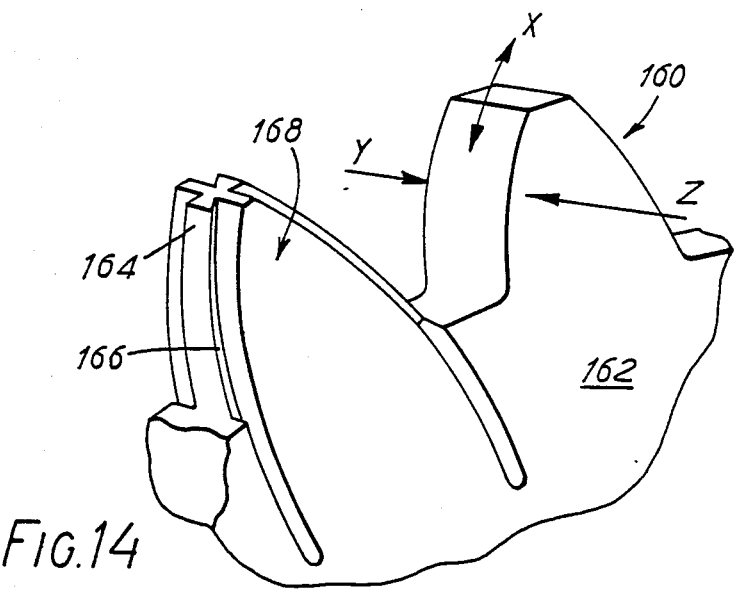
FIG. 14 is an isometric view of two adjacent teeth illustrating possible machining directions.

FIG. 14 shows an unmachined tooth 160 on a blade 162 and how the use of laminated blades according to the invention allows machining from directions X, Y and Z to form serrations 164, having for example inclined side faces 166 as shown on the adjacent tooth 168, and indeed all the above-described configurations of serration.

The cutting serrations in the teeth of the above described tools can be freely machined by grinding or milling in either the soft or heat-treated condition and a very high degree of surface finish obtained. Similarly the shape of the cutting serrations is unrestricted, allowing the production of a variety of forms.

I claim:

1. A laminated gear shaving tool comprising a body adapted to be rotated about a predetermined axis, a plurality of separately formed discs mounted rigidly on said body and forming a stack of discs extending along said axis, said discs being disposed in planes extending perpendicular to said axis, each of said discs having two opposite axially facing sides and each being formed with a predetermined number of circumferentially spaced teeth, each of said teeth having two opposite circumferentially facing flanks, each flank of a majority of said predetermined number of teeth and one flank of a minority of said predetermined number of teeth being cut away at each axially facing side of each disc so as to form a land on each flank of each of said majority of teeth and on said one flank of each of said minority of teeth the other flank of each of said minority of said predetermined number of teeth being cut away at only one axially facing side of each disc so as to form a land on said other flank of each of said minority of teeth, the lateral edges of each land constituting cutting edges, and the cutting edges of the land of each tooth being staggered axially from the cutting edges of the corresponding land of each adjacent tooth whereby the position of a stagger line around the circumference of each disc and defined by one set of lateral cutting edges on successive lands is arranged such that the teeth may be sharpened a number of times with each sharpening leaving renewed cutting edges on such lands and maintaining an effective cutting edge at the joint line between adjacent discs.

2. A tool as defined in claim 1 in which the cutting edge of one side of one of the lands of one of said minority of teeth is located at one side of said disc, the cutting edge of the opposite side of a corresponding land of another of said minority of teeth being located at the opposite side of said disc.

3. A tool as defined in claim 1 in which each of said cutting edges of said majority of teeth is defined at the intersection of a circumferentially facing cutting face on the respective land and a generally axially facing relief face on the land, the two relief faces of each land being re-entrant and being non-parallel such that the two relief faces converge toward one another as they progress away from the cutting face.

4. A tool as defined in claim 1 in which said discs are subjected to surface treatment with titanium nitride.

5. A tool as defined in claim 1 in which at least some of said cutting edges are inclined with respect to the sides of the discs, the inclination of the cutting edges on a flank of one tooth being opposed to that of the cutting edges on the corresponding flank of an adjacent tooth.

* * * * *